No. 871,802. PATENTED NOV. 26, 1907.
H. J. JOHNSON & T. J. LARKIN.
MARKET BOX DISPLAY CASE.
APPLICATION FILED FEB. 1, 1907.

Witnesses:

Inventors
Henry J. Johnson
Thomas J. Larkin

THE NORRIS PETERS CO., WASHINGTON, D. C.

UNITED STATES PATENT OFFICE.

HENRY J. JOHNSON AND THOMAS J. LARKIN, OF LOWELL, MASSACHUSETTS.

MARKET-BOX DISPLAY-CASE.

No. 871,802.     Specification of Letters Patent.     Patented Nov. 26, 1907.

Application filed February 1, 1907. Serial No. 355,342.

*To all whom it may concern:*

Be it known that we, HENRY J. JOHNSON and THOMAS J. LARKIN, citizens of the United States, residing at Lowell, in the county of Middlesex and State of Massachusetts, have invented a new and useful Market-Box Display-Case, of which the following is a specification.

This invention relates to market box display cases. Its principal purpose is to provide a portable show case which can be placed over the ordinary wooden market box containing a bushel, more or less, of vegetables or fruit. It is provided with a hinged glass top, whereby the contents can be easily reached and can be seen through the glass but which protects the provisions from dust, dirt, air and germs. It serves to preserve the provisions, is of benefit to the health of the customer, and permits the market man to display his goods to advantage. It can also be used to cover platters containing meat, fish or fowls.

Figure 1:
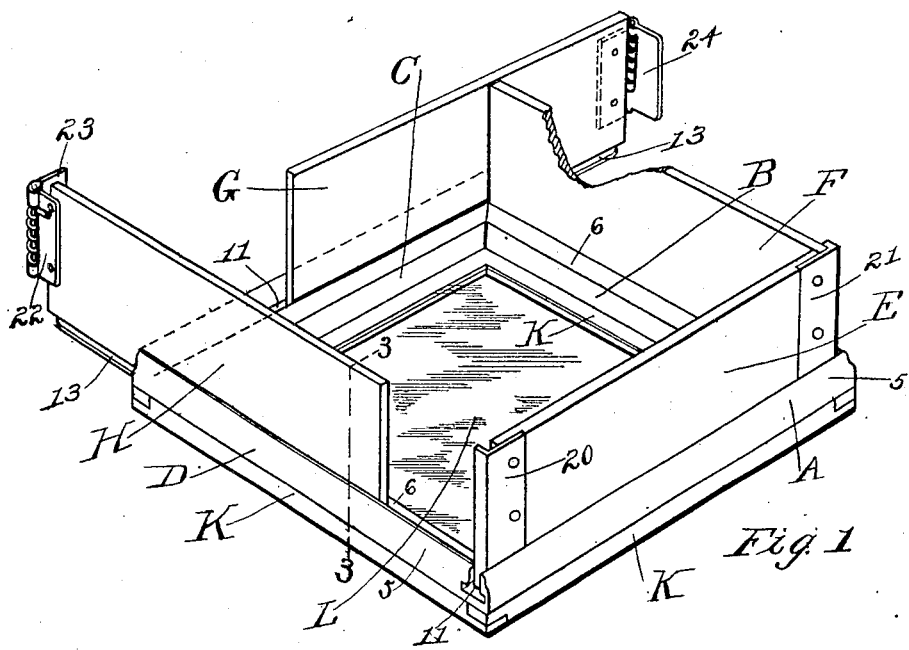
Figure 3:
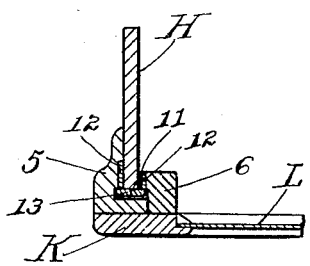
Figure 2:
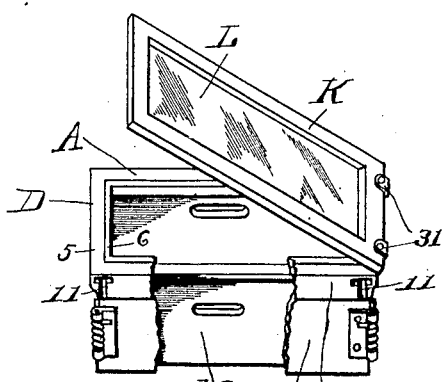
Figure 4:
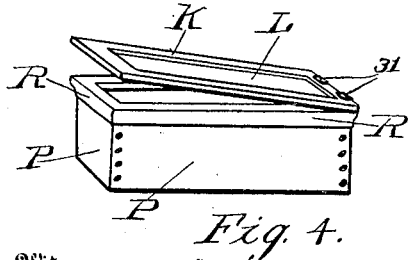

In the drawings, Figure 1 shows one form of the device upside down and with two sides partially slid out. Fig. 2 shows the same form of device in place over an ordinary market box, a portion of one side being cut away. Fig. 3 is a section on the line 3, 3 of Fig. 1, showing the grooves and ribs. Fig. 4 shows a modified and simpler form of the device.

The simplest form of the device is shown in Fig. 4, wherein P, P represent the sides of a rectangular box of suitable size. These sides are nailed, screwed, or otherwise fastened together and are preferably surmounted by a molding R, R. To this molding is hinged at 31, a sash K carrying a pane of glass L. I prefer however to make a device of the knock down variety which can be more readily stored and packed such as is shown in Figs. 1, 2 and 3.

A, B, C, D show a rectangular frame formed of moldings strongly fixed together at the corners. Each side of this frame is formed of two strips of molding 5 and 6, each so grooved as to form when put together and reinforced by strips of metal 12, 12, a T shaped groove 11. The groove in side A extends at one end out through the end of side D. Similarly the groove in side D extends out through side C and groove in side C extends out through the end of side B. Between sides A and B is a solid corner. The groove in side B enters the groove in side A and extends out through side C.

Along the top edge of each of the box sides E, F, G and H is fastened a projecting metal rib 13 which fits snugly in the T shaped grooves 11. Box side E is of just the length of the inside edge of groove 11 in side A and is provided at each end with angle irons 20 and 21 which are so attached as to leave a sufficient space beyond the ends of box side E to receive the ends of box sides H and F. Referring to Fig. 1, side E is first slid into place through the open end of groove 11 in side A until it is stopped by striking side B. Box side H is then slid in through the open end of the groove in side D until its plain end passes in between angle iron 20 and the end of box side E. Box side E is thereby held firmly in place.

Box side H is just the length of the inside edge of groove 11 in side D and carries at its other end a powerful spring hinge 22 whose free leaf 23 is pivoted at a distance equal to the thickness of box side G away from the end of box side H. Hence, when box side G is slid into groove 11 in side C, and leaf 23 is opened by hand and then closed on it, its plain end will be forcibly clasped between leaf 23 and the end of the box side H. Thereby box side G holds box side H in place and is itself held in place by the pressure of spring hinge 22. The third box side to go in, however, is F, which has no attachments at either end. It is slid into the open end of groove 11 in box side B until its plain end rests between the end of box side E and angle iron 21. This box side F is the same length as box side H and extends, when in place, only to the inner side of the groove 11 in side C. The last box side to go in, is box side G, the longest box side, which is slid into the open end of groove 11 in side C until it is clasped, as described, by leaf 23. At its other end, box side G is provided with a spring hinge 24 similar to the hinge 22 on the end of the box side H except that its free leaf rests snugly against the end of G. This hinge 24 serves to prevent box side F from being displaced.

The cover consists of a wooden sash K which carries a glass pane L and is hinged to frame A, B, C, D by hinges 31. It will be seen by examining Fig. 2 that when the device is placed over a market box, such as M, the market box is entirely covered up and, at the same time, its contents can be viewed through the glass top L and its contents can be readily reached by lifting the glass cover.

As described, the four box sides E, F, G and H may be made permanent instead of detachable and it will be readily seen that other methods of removing and attaching the box sides may be used.

What I claim as my invention and desire to cover by Letters-Patent is:—

In a market box display case, a top framework comprising a side A in which is a longitudinal T shaped groove open at one end, a box side E provided at its top with a projecting metal rib which rests in the groove in side A and is provided at each end with angle irons, a side D in which is a T shaped groove open at one end, a box side H provided at its top with a projecting metal rib which rests in the groove in side D and carries at its exposed end a spring hinge, a side C provided with a T shaped groove open at one end, a box side G provided at its top with a projecting metal rib which rests in the groove in side C and provided at its exposed end with a spring hinge, a side B in which is a T shaped groove which is open at one end and at its other end enters the groove in side A, a box side F provided at its top with a projecting metal rib which rests in the groove in side A and plain at both ends, and a hinged glass cover as described.

HENRY J. JOHNSON.
THOMAS J. LARKIN.

Witnesses:
JOHN F. LEARY,
PETER J. DONNELLY.